(12) United States Patent
Kerr

(10) Patent No.: US 7,328,043 B2
(45) Date of Patent: Feb. 5, 2008

(54) TELEPHONY APPARATUS FOR PBX SYSTEM

(75) Inventor: Benjamin James Kerr, Wootton Fields (GB)

(73) Assignee: Avaya ECS Ltd., Welwyn Garden City, Hertfordshire (GB)

( * ) Notice: Subject to any disclaimer, the term of this patent is extended or adjusted under 35 U.S.C. 154(b) by 0 days.

(21) Appl. No.: 11/200,399

(22) Filed: Aug. 9, 2005

(65) Prior Publication Data

US 2006/0068774 A1 Mar. 30, 2006

(30) Foreign Application Priority Data

Sep. 30, 2004 (EP) ................... 04256065

(51) Int. Cl.
*H04M 1/00* (2006.01)
(52) U.S. Cl. ............... 455/557; 455/426.1; 455/554.1; 455/462; 455/555; 379/265.09
(58) Field of Classification Search ............... 455/557, 455/426.1, 554.1, 555, 462; 379/265.09
See application file for complete search history.

(56) References Cited

U.S. PATENT DOCUMENTS

| 5,073,928 | A | | 12/1991 | Shimanuki | |
|---|---|---|---|---|---|
| 5,297,203 | A | * | 3/1994 | Rose et al. | 380/270 |
| 5,463,659 | A | * | 10/1995 | Nealon et al. | 375/133 |
| 5,754,625 | A | | 5/1998 | Shimura | |
| 6,014,559 | A | * | 1/2000 | Amin | 455/413 |
| 6,389,299 | B1 | | 5/2002 | Park | |
| 6,430,395 | B2 | * | 8/2002 | Arazi et al. | 455/41.2 |
| 6,941,156 | B2 | * | 9/2005 | Mooney | 455/553.1 |
| 7,072,675 | B1 | * | 7/2006 | Kanakubo | 455/462 |
| 2002/0082000 | A1 | * | 6/2002 | Sakai et al. | 455/414 |
| 2005/0068938 | A1 | * | 3/2005 | Wang et al. | 370/352 |
| 2006/0135151 | A1 | * | 6/2006 | Mu et al. | 455/426.1 |
| 2006/0229068 | A1 | * | 10/2006 | Niemela et al. | 455/426.1 |
| 2006/0240816 | A1 | * | 10/2006 | Sutardja | 455/426.1 |

FOREIGN PATENT DOCUMENTS

| EP | 04 25 6065 | 1/2005 |
|---|---|---|
| GB | 2 397 976 A | 8/2004 |

\* cited by examiner

*Primary Examiner*—Nghi H. Ly
(74) *Attorney, Agent, or Firm*—Ryan, Mason & Lewis, LLP

(57) ABSTRACT

There is disclosed a telephony apparatus comprising a base station and a handset, one of the base station and the handset being connected to a telephony system via an IEEE 802.11 interface, the base station and the handset each further being provided with a Bluetooth interface, speech data and/or control data being transmitted between the base station and the handset on the Bluetooth interface.

21 Claims, 2 Drawing Sheets

TELEPHONY APPARATUS FOR PBX SYSTEM

FIELD OF THE INVENTION

The present invention relates to a telephony apparatus, including a handset and/or a base station, which apparatus is configured to connect with a telephony system for establishing communications. The telephony system is preferably, but not exclusively, a private branch exchange, and particularly preferably a wireless private branch exchange.

BRIEF DESCRIPTION OF THE RELATED ART

A private branch exchange (PBX) is an example of a telephony system. In a typical PBX system, one or more central switches are provided, each being associated with a plurality of telephone apparatus. The one or more central switches typically enable telephone calls to be established between the telephone apparatus connected thereto. The one or more central switches further may typically be connected to a public switched telephone network (PSTN), and enable telephone calls to be established between telephone apparatus connected to the one or more switches and other telephone apparatus connected to the PSTN. Such PBX systems are typically provided in an enterprise environment, and may typically be referred to as enterprise systems.

The typical telephone apparatus of any PBX may vary in configuration, but it is typical for a telephone apparatus to comprise a so-called deskset, which may be wall or desk mounted. A deskset typically includes a base station part which is wall mounted or sits on a desk, and a handset part which is moveable. The handset part is typically electrically connected to the base station part by a coiled wired connection. The base station part typically has a wired connection which plugs into a socket which is wired to the PBX system.

A further known telephone apparatus deployed in a PBX system provides a wireless link between the handset part and the base station part, using a localized wireless interface there between. This allows the user of a handset to roam further from the base station part than is permitted by a fully wired telephony apparatus.

Both of such typical telephone apparatus of a PBX system require wiring of the base station part into the PBX system, and this makes the deployment of new telephone apparatus in the system less than straightforward. It may be necessary to deploy additional system wiring. It may be necessary to provide additional sockets by 'breaking out' existing wiring.

In an improved PBX system in the prior art there has been proposed to provide the connection between the telephony apparatus and the PBX system via a relatively long range wireless communication interface. In one solution this is proposed to be achieved by providing the necessary wireless interface in the handset part, together with the appropriate user interface. The user interface, generally, includes a user input such as a keypad having various keys, and a user output such as one or more displays. A display may include an LCD display, or one or more LEDs, or other visual indicators. For a handset in a PBX system, the user interface may specifically include PBX "feature" buttons, and message waiting indicators. In providing this functionality in the handset, the provision of a base station part becomes redundant. There is only a need to provide a means to recharge the handset part.

However in many applications familiarity with the traditional telephone apparatus having a base station part and a handset part is such that such a 'handset only' wireless solution is unsatisfactory.

Furthermore, certain functionality may be most efficiently provided on a base station part. The provision of certain functionality in a base station part may provide a technically enhanced telephony apparatus.

It is an aim of the invention to provide an improved telephony apparatus, suitable for use in a PBX system.

SUMMARY OF THE INVENTION

In accordance with the invention there is preferably provided a handset for a telephone apparatus, the handset including a Bluetooth interface for communicating with a base station of the apparatus.

The Bluetooth interface may be for the transmission of speech data and/or control data between the handset and the base station.

The handset may be adapted to communicate with a telephony system. The handset may further include an interface for communication with a telephony system. The interface for communication with a telephony system may be a wireless interface. The wireless interface for communication with a telephony system may be a voice-over-Internet Protocol (VoIP) interface. The wireless interface for communication with a telephony system may be an 802.11 interface.

The Bluetooth interface of the handset may be enabled in a predetermined mode of communication. The transmission of speech data between the handset and the base station may be enabled in a predetermined mode of communication.

The predetermined mode of operation may be a hands free mode, a speaker phone mode, or a conference mode of operation. On selection of the predetermined mode of operation, a control signal may be transmitted from the handset using the Bluetooth communication link. Responsive to the control signal, the handset may be enabled to provide the functionality associated with the predetermined mode of operation.

In the predetermined mode of operation, the handset may transmit speech data to the base station. The handset may include means for encoding speech data. The base station may be provided with means for converting speech data received from the handset into an audio signal. The audio signal may drive a speaker. The handset may be provided with means for encoding speech data. The base station may be provided with means for decoding speech data.

In the predetermined mode of operation the handset may receive speech data from the base station at the Bluetooth interface. The speech data may comprise speech detected at a microphone of the base station, converted into speech data at the base station, and transmitted to the Bluetooth interface of the handset. The handset may include means for decoding received encoded speech data.

In accordance with the invention there is preferably provided a base station for a telephone apparatus, the base station including a Bluetooth interface for communicating with a handset.

The Bluetooth interface may be for the transmission of speech data and/or control data between the base station and the handset.

The base station may be adapted to communicate with a telephony system. The base station may further include an interface for communication with a telephony system. The interface for communication with a telephony system may be a wireless interface. The wireless interface for communication with a telephony system may be a voice-over-Internet Protocol (VoIP) interface. The wireless interface for communication with a telephony system may be an 802.11 interface.

The Bluetooth interface of the base station may be enabled in a predetermined mode of communication. The transmission of speech data between the base station and the handset may be enabled in a predetermined mode of communication.

The predetermined mode of operation may be a hands free mode, a speaker phone mode, or a conference mode of operation. On selection of the predetermined mode of operation, a control signal may be received by the base station using the Bluetooth communication link. The control signal may be received from the handset. Responsive to the control signal, the base station may be enabled to provide the functionality associated with the predetermined mode of operation.

In the predetermined mode of operation, the base station may receive speech data from the base station. The base station may be provided with means for converting speech data received from the handset into an audio signal. The base station may be provided with means for converting received speech data into an analogue signal, and means for driving a speaker with said analogue signal. The base station may be provided with means for decoding encoded speech data received at the Bluetooth interface.

In the predetermined mode of operation the base station may transmit speech data to the handset at the Bluetooth interface. The speech data may comprise speech detected at a microphone of the base station, converted into speech data, and transmitted at the Bluetooth interface of the base station.

The preferable handset and the preferable base station may be provided together in a telephony apparatus. The handset and the base station may be configured to interoperate exclusively with each other. There may be provided a plurality of preferable handsets and a plurality of preferable base stations in a telephony system, each handset being uniquely associated with at least one base station for communication purposes.

In accordance with the invention there is preferably provided a telephone apparatus comprising: a handset having a first wireless interface for communication with a telephony system and a second wireless interface for communication with a base station, the base station having a wireless interface for communication with the handset, the handset being adapted to receive speech data on said first wireless interface and to transmit speech data on said second wireless interface, the base station being adapted to receive speech data on said wireless interface.

The first wireless interface of the handset may be of a first type, and the second wireless interface of the handset may be of a second type. The handset may further be provided with means for converting speech data of a first type received at the first wireless interface into speech data of a second type for transmission at the second wireless interface. The handset may further be provided with means for converting speech data of a second type received at the second wireless interface into speech data of a first type for transmission at the first wireless interface The base station wireless interface may be of the second type.

In accordance with the invention there is preferably provided a telephone apparatus that may comprise: a handset including a first wireless interface for communicating with a PBX system and a second wireless interface comprising a Bluetooth interface; and a base station including a wireless interface comprising a Bluetooth interface, the handset and the base station being adapted to transmit speech data between the respective Bluetooth interfaces.

In accordance with the invention there is provided a telephone apparatus comprising a handset having a short range wireless interface and a base station having a short range wireless interface, the handset and the base station being configured to communicate via the respective short range wireless interfaces.

The telephone apparatus may be further configured to communicate with a telephony system. The telephony system may be a PBX system. The PBX system may be a wireless PBX system.

The handset may be provided with an interface to the telephony system. The base station may be provided with an interface to the telephony system.

The interface to the telephony system may be a wireless interface. The interface to the telephony system may be a voice over Internet protocol (VoIP) interface. The interface to the telephony system may be a 802.11 interface.

The short range communication interface may be a pulse code modulated interface. The short range interface may be a pulse code modulated, A-law/u-law interface, or Continuous Variable Slope Delta (CVSD) speech interface. The short range communication interface may be a Bluetooth interface.

The handset and the base station may be configured to communicate speech data via the short range communication interface. The handset and the base station may be configured to communicate control information data via the short range communication interface. The control information data may be associated with speech data.

The base station may be configured to receive speech data from the handset, and convert said speech data to an audio signal for amplification on a speaker.

When provided with an interface to a telephony system, the handset may receive speech data of a first format at said interface from the telephony system. The handset may include means for converting said speech data of a first format into speech data of a second format. The speech data of a second format may be transmitted from the short range wireless communication interface of the handset.

The invention also provides a method of operating a wireless telephony apparatus comprising a wireless handset and a base station, comprising, at the handset: receiving a encoded speech in a VoIP format; converting the VoIP format speech into a personal area wireless network format; transmitting the speech in the personal area wireless network format, the method further comprising, at the base station, receiving the speech in the personal area wireless network format, converting the received speech into an analogue signal, and driving a speaker with said analogue signal.

BRIEF DESCRIPTION OF THE FIGURES

The invention is described with regard to preferred embodiments by way of reference to the accompanying FIGURE, in which.

DESCRIPTION OF PREFERRED EMBODIMENTS

The invention is described herein by way of example with reference to specific embodiments. The invention is, however, not limited to specific aspects of such described embodiments, and one skilled in the art will understand the broader applicability of the invention.

Figure 1:
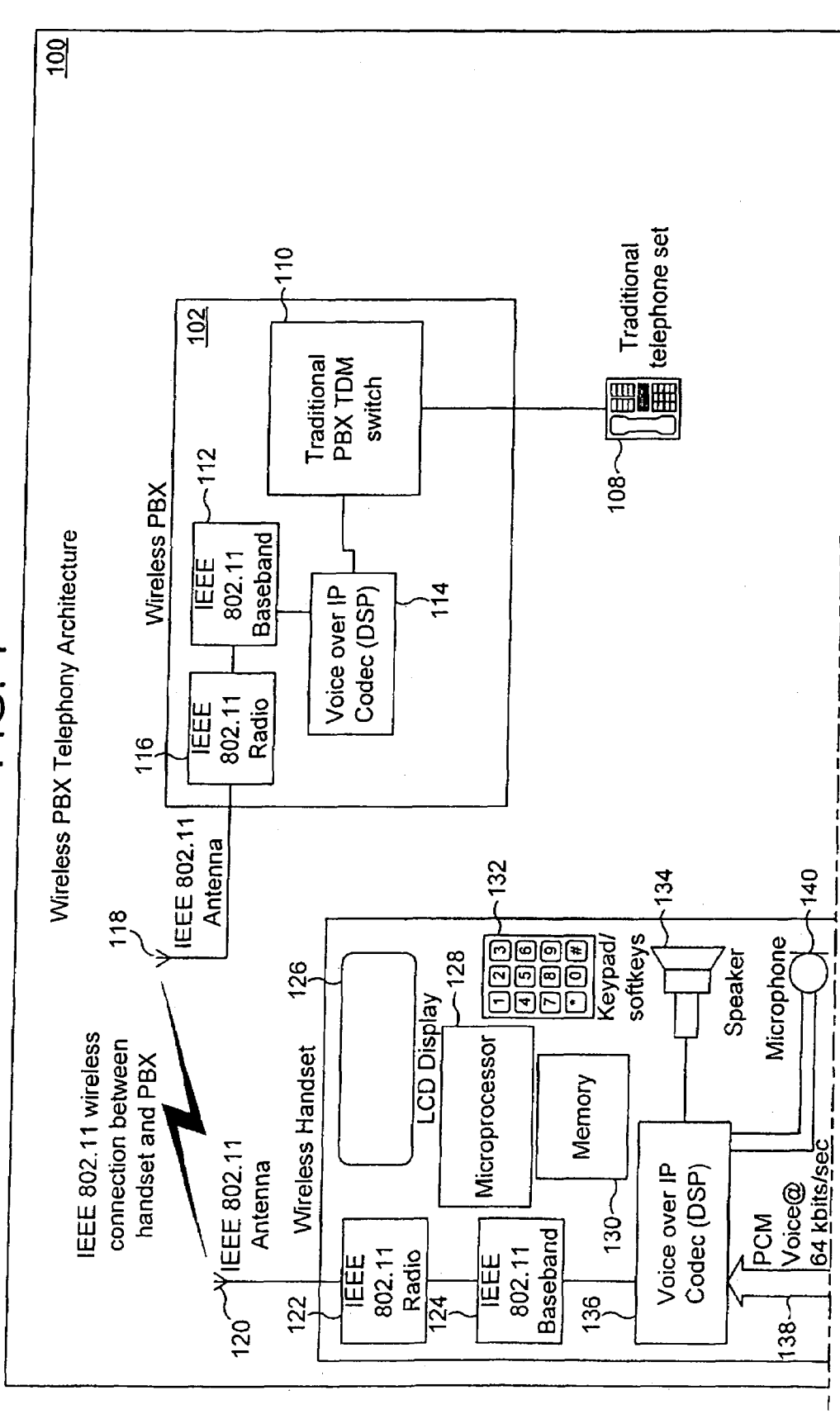
FIG. 1 illustrates an exemplary PBX system implementing principles of the invention.
Figure 1:
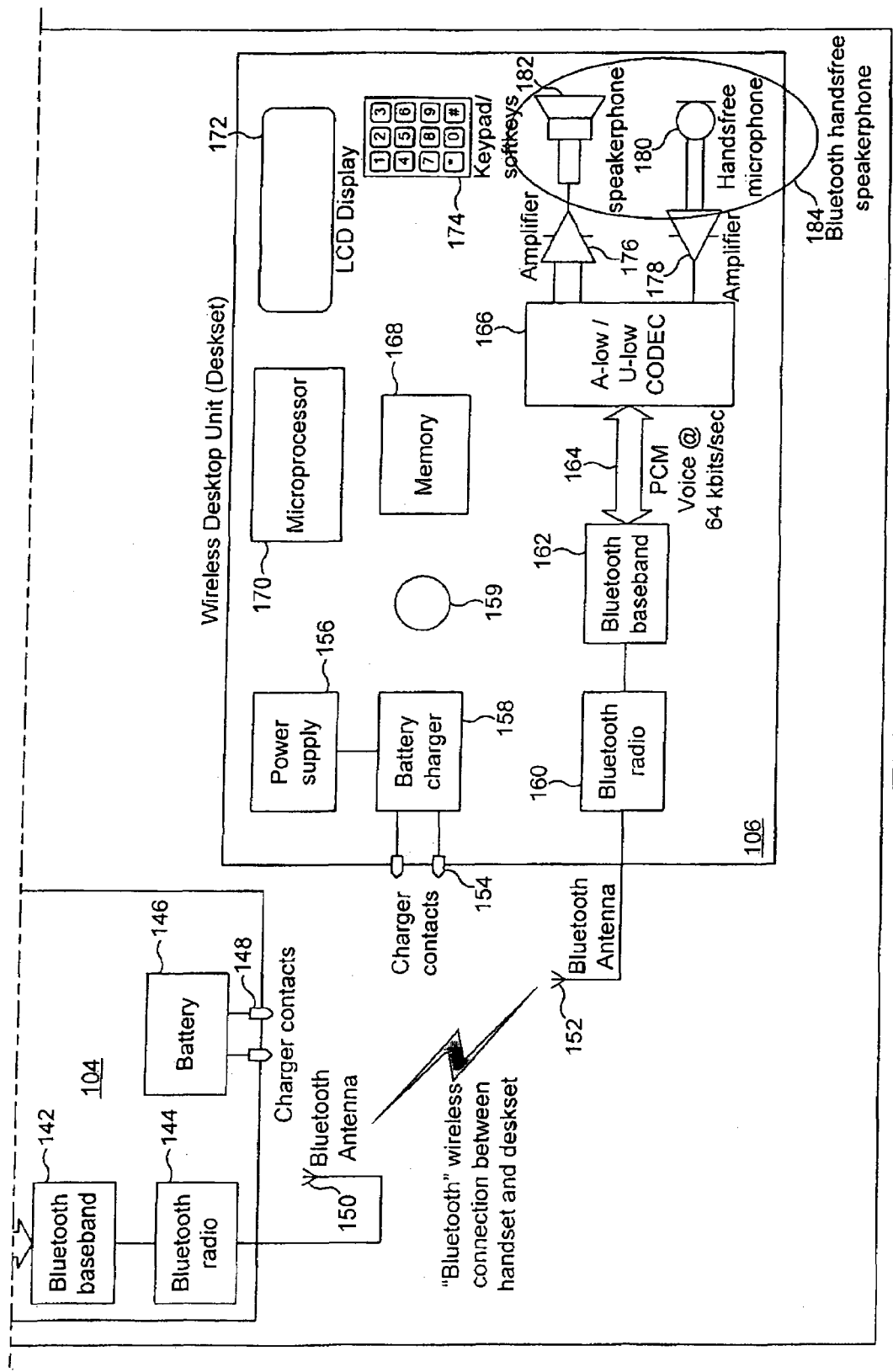

With reference to FIG. 1, there is illustrated an exemplary wireless telephony architecture 100 in which the principles of the invention may be applied. The wireless telephony architecture 100 shown in FIG. 1 is that of an enterprise private branch exchange (PBX), such as may be used to provide switchboard telephony facilities in an enterprise or commercial environment.

The wireless telephony architecture 100 generally includes a private branch exchange (PBX) designated by reference numeral 102, one or more traditional fixed wired 'desktop' telephony apparatus such as desktop telephone 108, and one or more wireless telephony apparatus, such as telephony apparatus including a handset 104 and a base station 106. The handset and base station of the wireless telephony apparatus are not connected to the PBX by fixed wires, but are connected wirelessly.

The provision of wireless telephony apparatus in a PBX system is known in the art. The invention and embodiments thereof proposes modifications to the telephony apparatus thereof, as discussed further below.

In FIG. 1 only those elements of the wireless telephony architecture 100 necessary for understanding the operation of embodiments of the invention are described and shown. It will be understood that further functional elements than those shown in FIG. 1 may be necessary to implement the wireless telephony architecture, however such functional elements and their connection/operation will be well known to one skilled in the art, and are therefore not described herein.

The PBX 102 includes a traditional PBX time division multiplexer (TDM) switch 110.

As illustrated in FIG. 1, the one or more fixed wired desktop telephone apparatus, such as desktop telephone 108, are wire connected to the traditional PBX TDM switch 110.

Cordless telephone handsets have also been provided in a PBX environment, which are wirelessly connected with a base station which is itself connected in a wired manner to the PBX. Such a base station may be wire connected to the PBX in the same manner as the traditional telephone handset 108.

In the art there has further been proposed a deskset telephone apparatus where the wireless capability is provided in the handset itself, such that the handset may be used as a cordless telephone in direct connection with the PBX. This potentially facilitates more flexible wireless functionality.

In order to facilitate this more flexible wireless functionality, the PBX 102 is further provided with a wireless interface. The wireless interface includes an encoding/decoding functionality and an appropriate transceiver, in accordance with the wireless functionality supported.

In the described embodiment it is assumed that the wireless functionality is provided by a wireless interface in accordance with the IEEE Standard 802.11, which standard is well known in the art. Various versions of the 802.11 standard exist. The IEEE 802.11 standard supports the transmission of voice or speech data using the Internet protocol (IP), so called Voice-over-IP (VoIP). It should be understood however that the invention, when used in a wireless PBX architecture, is not limited to any specific wireless protocol used by the PBX architecture. Any wireless protocol may be used in the PBX architecture.

In general it may be considered that the PBX is provided with a wireless interface of a first type, for supporting a first type of wireless communication. The first type of wireless interface is preferably a medium range wireless interface.

As in the described exemplary embodiment the wireless PBX utilizes an IEEE 802.11 interface supporting VoIP, the wireless interface of the PBX 102 includes a VoIP codec (coder/decoder) 114 connected to the PBX TDM switch 110. The VoIP codec 114 may be provided as, or in combination with, a digital signal processor (DSP). The VoIP codec 114 converts speech data between a format suitable for transmission on the 802.11 interface and a format (such as analogue) suitable for the PBX TDM switch 110.

The wireless interface of the PBX 102 is further provided with an IEEE 802.11 baseband processor 112, connected to the VoIP codec 114, and an IEEE 802.11 radio 116 connected to the IEEE 802.11 baseband processor 112. The IEEE 802.11 radio 116 is connected to an appropriate IEEE 802.11 antenna arrangement 118. As will be understood by one skilled in the art, transmission of coded speech at the output of the VoIP codec 114 is via the baseband processor 112, the radio 116 and the antenna 118. Similarly encoded speech is received via the antenna 118, the radio 116 and the processor 112 and presented to the codec 114 for decoding.

The wireless PBX 102 may be considered to function as a base station for wireless telephony apparatus associated with the wireless PBX. Wireless or wired repeaters may be associated with the wireless PBX 102. Additional 802.11 access points not contained within the wireless PBX may also serve to pass VoIP encoded data from the wireless PBX to the wireless handset, using a traditional wired connection, for example IEEE 802.3. Thus the wireless telephony apparatus may, in general, communicate wirelessly with an access point for the PBX, the wireless access point being connected in a wired or wireless fashion to the PBX. A wireless access point may be connected to a local area network to which the PBX is also connected. The wireless functionality of the PBX may therefore be provided by a device external to, but connected to, the PBX.

An example of wireless telephony apparatus is a deskset telephone equipped with an appropriate wireless capability for communicating with the PBX. Thus within the PBX architecture, the introduction of wireless capability allows deskset telephone equipment to be deployed without the need for wiring. Such deskset telephone equipment may otherwise correspond in look, operation, and functionality to that of a conventional wired deskset telephone equipment, the only difference being that there is no requirement to plug a wire of the deskset telephone equipment into a telephone socket.

Referring again to FIG. 1, there is illustrated an exemplary wireless handset 104 suitable for operation in a wireless telephony architecture including a PBX having wireless capability in accordance with a first embodiment of the invention.

The wireless handset 104 is provided with a first wireless interface compatible with the wireless interface of the PBX. Thus, in general, the first wireless interface of the wireless handset is of a first type, for supporting a first type of wireless communication.

In the described embodiment, the wireless handset 104 is provided with an IEEE 802.11 wireless interface. The wireless interface of the handset 104 includes an IEEE 802.11 antenna 120, an IEEE 802.11 radio 122 connected to the antenna 120, and an IEEE 802.11 baseband processor 124 connected to the radio 122. The baseband processor 124 is further connected to a VoIP codec 136, which as in the PBX may be implemented as, or as part of, a DSP.

The antenna 120, radio 122, baseband processor 124 and VoIP codec 136 of the handset 104 operate in a similar manner to the antenna 118, radio 116, baseband processor 112 and VoIP codec 114 of the PBX 102. Encoded speech data is received at the antenna 120, and presented in decoded form at an output of the codec 136. Speech data at an input of the codec 136 is transmitted in encoded form at the antenna 120.

In FIG. 1 it can be seen that the VoIP codec 136 has a first output connected to a speaker 134. The first output of the codec 136 represents a first decoded version of the speech data received on the 802.11 wireless interface of the handset. The first decoded output of the codec 136 generates an analogue or audio signal for driving the speaker 134. In addition the codec has a first input, represented by a pair of lines connected from a microphone 140. The microphone 140 detects sound such as speech, and provides an analogue signal representing such speech to the first input of the codec 136. The thus received analogue signal is encoded by the codec 136 for transmission on the 802.11 wireless interface of the handset to the PBX wireless interface.

The microphone 140 and the speaker 134 are preferably mouth and earpieces respectively of a portable handset, provided in a conventional manner. In this way the 802.11 wireless interface of the handset, in conjunction with the codec, enable a telephone call to be established between the PBX 102 and the wireless handset 104 in a manner known in the art.

The wireless handset 104 is provided with various further functionality as is known in the art. This functionality is provided by various elements, some of which are illustrated in FIG. 1. The interconnection of these elements is not, however, shown in FIG. 1. The interconnection will be well known to one skilled in the art. The handset is preferably provided with a battery 146, which is preferably rechargeable, the handset having contact points 148 for connecting the battery 146 to a charger. The handset is preferably provided with an LCD display 126. The LCD operates as known in the art to display called and caller information for example, as well as display menu options and directory contents. The handset is preferably provided with a keypad 132 or soft keys. The keypad 132 presents an alphanumeric display, in accordance with any conventional telephone handset arrangement, for entering numbers, answering telephone calls, viewing directory contents etc. The handset is preferably provided with a memory 130, which for example stores a directory of telephone numbers. The handset is further preferably provided with a microprocessor 128, the microprocessor controlling the various functional operations of the handset, including the operation of the first wireless interface.

Where a handset is provided with wireless capability to communicate with the PBX 102 directly, there is no requirement for a base station equipped with telephony functionality to be provided in combination with the handset. All that may be necessary is to provide some means for charging a rechargeable battery of the handset (where provided), and this may be provided by a simple docking station connected to a main power supply. In a preferred embodiment of the invention, however, a base station is provided for use with the handset to provide additional functionalities. As now discussed below, the wireless handset is provided with an interface to a base station in this first preferred embodiment.

In accordance with the implementation of the invention in this exemplary first embodiment, the VoIP codec 136 is provided with a further input/output 138. This input/output is connected to a second wireless interface of the handset 104. The second wireless interface is for supporting a second type of wireless communication. The second wireless interface is preferably a short range wireless interface. The short range wireless interface may have a wireless range less than that of the medium range wireless interface of the first type of wireless communication.

The second wireless interface, as shown in FIG. 1, includes a short range baseband processor 142, a short range radio 144, and a short range antenna 150. The short range interface is, in the preferred embodiment, a Bluetooth interface, the baseband processor 142, the radio 144 and the antenna 150 each being respectively a Bluetooth baseband processor, a Bluetooth radio and a Bluetooth antenna.

The signals on the input/output between the VoIP codec 136 and the second wireless interface of the handset are, where the second wireless interface is a Bluetooth interface, signals formatted for transmission on a Bluetooth link. These signals are pulse code modulated signals, comprising A-law/u-law speech at 64 kbits/sec or continuous variable slope delta (CVSD) signals at 64 kbits/sec.

Thus the handset codec provides signals received on a first wireless interface of the handset in a format for transmission on a second wireless interface of the handset. Conversely the handset codec provides signals received on the second wireless interface of the handset in a format for transmission on the first wireless interface of the handset.

The codec 136 of the wireless handset 104 thus preferably has two codec modes of operation. One mode of operation is IEEE 802.11 to analogue and vice versa, and another mode of operation is IEEE 802.11 to Bluetooth and vice versa.

A base station with which the wireless handset is preferably adapted to cooperate with in accordance with this first embodiment of the invention is the wireless desktop unit or desk set 106.

In an embodiment the base station is provided with a wireless interface, being a wireless interface of the second type compatible with the second wireless interface of the wireless handset 104. The wireless interface of the base station is thus preferably a short range wireless interface. The wireless interface of the base station 106 includes a short range baseband processor 162, a short range radio 160, and a short range antenna 160.

The short range interface of the base station 106 is, in preferred embodiments, a Bluetooth interface, the baseband processor 162, the radio 160 and the antenna 152 each being respectively a Bluetooth baseband processor, a Bluetooth radio and a Bluetooth antenna.

The signals on an input/output 164 of the short range baseband processor 162 are, where the wireless interface is a Bluetooth interface, signals formatted for transmission on a Bluetooth link.

In a Bluetooth implementation, the base station 106 further includes a codec 166 suitable for coding/decoding Bluetooth signals. In the Bluetooth implementation the information transmitted on the input/output 164 is pulse code modulated (PCM) A-law/u-law speech data at 64 kbits/sec or continuous variable slope delta (CVSD) signals at 64 kbits/sec. The codec 166 is preferably an A-law/u-law or continuous variable slope delta (CVSD) to analogue and vice versa codec.

Encoded speech data on the input/output 164 is decoded by the codec 166 into analogue signals and provided to an amplifier 176 which drives speaker 182. The amplifier 176 and speaker 182 are preferably arranged such that they provide a speaker arrangement which is suitable for a hands-free telephony apparatus.

Speech or other sound is detected by a microphone 180 and provided to an amplifier 178, the output of which is encoded by the codec 166 into Bluetooth encoded speech data. The amplifier 178 and microphone 180 are preferably arranged such that they provide a microphone arrangement which is suitable for a hands-free telephony apparatus.

The codec 166 of the base station 106 has a single codec mode of operation. The mode of operation is, in a preferred arrangement, Bluetooth to analogue and vice versa.

In combination, therefore, the speaker 182 and microphone 180 provide a hands-free speakerphone for the wireless handset 104. The connection of the hands-free speakerphone to the wireless interface of the base station being of a second type, which in turn connects to the wireless interface of the wireless handset 104 being of a second type, provides a hands-free speakerphone for the wireless handset.

It should be noted that the speaker 134 and microphone 140 of the wireless handset 104 may be adapted such that they may also provide hands-free speakerphone functionality, as is known in the art. The above described hands-free functionality for the wireless handset 104 provided on the base station 106 may be provided in addition to or instead of hands-free functionality on the wireless handset itself. The provision of the hands-free functionality on the base station may be preferred, for example, since it enables a desk mounted unit to be used as a speakerphone, which may be more appropriate in conference-style telephone calls. The provision of the hands-free functionality on the base station may be preferred, for example, since it provides a familiar physical arrangement and functional operation for a user. The provision of the hands-free functionality on the base station may be preferred, for example, since it provides a dedicated hands-free arrangement. The hands-free functionality provided in the base station may allow a better quality or larger speaker to be provided, and a better quality microphone. Better quality speech processing circuitry may also be provided in the base station. The provision of the base station may therefore provide for better quality of operation. With a hands-free functionality provided on the wireless handset itself, it is necessary to ensure that the handset is orientated correctly to achieve optimum call quality in hands-free operation, for example to 'direct' the microphone correctly. No such problem exists when the hands-free arrangement is deployed in the base station.

The hands free speakerphone functionality for the wireless handset 104, as described, may be enabled responsive to a control signal. The control signal may be responsive to depression of an appropriate key on the keypad 132 of the wireless handset 104, or selection (also by key depressions) of a function option viewed on a menu displayed on the LCD display 126. The selection of a hands-free speakerphone operation in such a way is preferably in accordance with known techniques in the art.

In this first embodiment of the invention the wireless interface of the second type transmits speech data between the handset and the base station.

Such a base station equipped to provide hands-free functionality for the handset, may be adapted to operate with any handset having an appropriate wireless interface compatible with the wireless interface of the base station.

Whilst in the above described first embodiment the handset is a wireless handset of a PBX system, in alternative arrangements the wireless handset may, for example, be a mobile cellular telephone, or other portable device for establishing communication with a telephony system via a wireless interface, a further wireless interface being provided to communicate with a base station.

It may be preferable, in alternative embodiments, to provide a base station which cooperates with a wireless handset, the base station having the same telephony functionality associated with a conventional deskset telephone base station. The provision of this functionality in a base station may be preferred by certain users.

Thus, again referring to FIG. 1, the base station 106 may be further provided in a second embodiment with a microprocessor 170, a memory 168, a LCD display 172, and a keypad 174. The functionality of these elements corresponds, respectively, to the functionality of the microprocessor 128, memory 130, LCD display 126, and keypad 132 of the wireless handset 126. Thus all functions which may be controlled by the wireless handset 104 may also be controlled by the base station 106, and all features which may be accessed by the wireless handset 104 may also be accessed by the base station 106. The base station is also provided with a "message waiting lamp", denoted by reference numeral 159. The lamp 159 may be an LED. Although not shown in FIG. 1, the wireless handset 104 may similarly be provided with a message waiting lamp.

The "message waiting lamp" is illuminated, as known in the art, to indicate pending voicemail messages. In accordance with this invention, there is provided a control signal for illuminating the lamp 159, as discussed further herein below.

In such an arrangement in accordance with the second embodiment preferably only the wireless handset 104 is provided with the wireless interface for connection with the PBX 102. Thus in this second embodiment the wireless interface of the second type is further used to communicate control information between the base station and the wireless handset. Thus, for example, when a user enters a telephone number to be dialed in the keypad 174 of the base station 106, the telephone number may be transmitted via the wireless interface of the second type of the base station 106 to the wireless interface of the second type of the wireless handset 104, the wireless handset 104 initiating the telephone call via the wireless interface of the first type thereof.

Similarly when a call is received by the wireless handset 106 on the wireless interface of the first type, the wireless handset may transmit control information via the wireless interface of the second type thereof to the wireless interface of the second type of the base station 106. The incoming call details may then be displayed on the LCD screen 172 of the base station 106.

Also, when a voice mail is received or deleted and notification of such communicated to the wireless handset in accordance with conventional techniques, a Bluetooth control signal from the wireless handset to the base station command the microprocessor 170 of the base station 106 to illuminate or extinguish the lamp as a result of the manipulation of voicemail messages stored by the PBX. In an alternative, the presence of voicemail messages may be indicated by, for example, a flashing icon on the LCD displays 172, rather than the lamp 159. Any conventional means for indicating 'message waiting' may be used.

Thus in the second embodiment the base station 106 may provide a user interface in the same way as a conventional desktop telephone set, but with the functionality for establishing a telephone call to the PBX, and generally communicating with the PBX, being provided only in the wireless handset; the base station and the wireless handset merely exchanging control information via their compatible wireless link of a second type. In the arrangement, the microprocessor 170 and memory 168 of the base station may be much simplified over that of the microprocessor 128 and the memory 130 of the wireless handset 104, due to the reduced functionality required in the base station 106, as all the telephony functionality is provided in the wireless handset 104.

In some enterprise PBX implementations familiarity with the traditional telephone apparatus having a base station part and a handset part is such that it is advantageous to provide a base station part having a traditional user interface, not least for user familiarity. For example, a system user may prefer to use the feature of 'on hook' dialing, where with the handset part in a docking station of the base station part, a telephone number is dialed on a keypad of the base station part. With a wireless handset and base station adapted in accordance with the second embodiment of the invention, such 'on hook' dialing may be provided for with the handset not even in the docking station. 'On hook' dialing may require the need to provide for a base station having a user interface which is compatible with the user interface traditionally provided with a base station part. The second embodiment described herein allows such functionality to be provided for the user, whilst providing the wireless interface of the first type only in the wireless handset, by providing the wireless interface of the second type between the handset and the base station.

In this second embodiment of the invention, the wireless interface of the second type transmits control information or control data between the handset and the base station.

In this second embodiment of the invention there may further be provided the speakerphone functionality for the wireless handset in accordance with the first embodiment, in which case the wireless interface of the second type additionally transmits speech data between the handset and the base station.

In any arrangement a base station may be uniquely associated with a wireless handset. The unique association may be dynamic or static. In a dynamic association, the handset and the base station may be configured to be associated with each other through a registration functionality enabled at one or other of the handset or the base station.

Thus the number of base stations may correspond to the number of wireless handsets, with respective handset and base station pairs having a unique association. Thus any given wireless handset may communicate with only one base station. All wireless handsets may communicate with the PBX, which in general provides a system-wide base station. A base station may be more appropriately named a docking station, the docking station having the wireless interface of the second type for communicating with a handset.

Thus, in general, there may be considered to be provided a system-wide or central base station, having a medium range wireless interface of a first type for communicating with a plurality of wireless handsets similarly having medium range wireless interfaces of the first type. The wireless handsets are further provided with short range wireless interfaces of a second type for uniquely communicating with an associated docking or base station similarly having a short range wireless interface of the second type.

The base station 106 is further preferably provided with, in all embodiments, means for charging a wireless handset. Thus as shown in FIG. 1 in the preferred embodiment the base station 106 includes a battery charger 158 having charger contacts 154, which cooperate with the charger contacts 148 of the wireless handset to charge the wireless handset. The battery charger 158 is connected to a power supply 156, which in turn is connected to an external power source (not shown).

In a third embodiment of the invention, the base station 106 is provided with a wireless interface of the first type for communication with the wireless interface of the PBX 102. Such wireless interface is the same as the first wireless interface of the wireless handset 104 as described hereinabove, and is not shown in the base station 106 of FIG. 1.

Where, as in this third embodiment, the base station 106 is provided with a wireless interface to the PBX 102, no such wireless interface need be provided in the wireless handset. In such an arrangement, the wireless handset may simply be provided only with the wireless interface of the second type, and a codec equivalent to the codec 166 of FIG. 1, and a speaker and microphone connected to such codec, such that the wireless handset can be used as a handset of the base station, with no additional functionality. All speech may be transmitted between the wireless handset and the base station via the compatible wireless interface of the second type, provided between them.

In the third embodiment of the invention the wireless interface of the second type thus transmits speech data between the handset and the base station. Control information may also be exchanged, for example if the wireless handset is provided with any functionality of a user interface.

In this third embodiment of the invention there may further be provided the speakerphone functionality for the wireless handset as discussed in relation to the first embodiment. In such modification a control signal, following a user selection on the handset, may be sent from the wireless handset to the base station via the communication interface of the second type. In this third embodiment the wireless interface of the second type may thus additionally transmit control data between the handset and the base station.

In a further modification to this embodiment, the wireless handset may in a fourth embodiment be provided with the necessary user interfaces to make and receive calls, and control information may be transmitted between the wireless handset 104 and the base station 106 via the compatible wireless interface there between. Thus telephone calls may be made and received on the wireless handset 104 as if the handset had full wireless functionality, but the establishment of the call is made by the base station 106.

This fourth embodiment is the inverse of the second embodiment described above, where a user interface was provided at the base station with the wireless interface of the first type provided in the handset. In this fourth embodiment, a user interface is provided in the handset, instead of or in addition to a user interface in the base station, and the wireless interface of the first type, for communicating with the PBX system, is provided in the base station.

In this fourth embodiment of the invention both speech data and control data or information is transmitted on the wireless interface of the second type between the wireless handset and the base station.

In this fourth embodiment of the invention there may further be provided the speakerphone functionality for the wireless handset in accordance with the first embodiment.

Although in the preferred embodiments the interface of a first type, when provided in a base station, is wireless, it need not necessarily be so. The base station may have a fixed wired connection of a first type to the PBX 102, and a wireless interface of the second type for communication with a wireless interface of the wireless handset.

Thus, in general, one of the handset and the base station of a telephony apparatus may be provided with an interface of a first type to a telephony system such as a PBX system. Each of the base station and the handset may be provided with a wireless interface of a second type for the transmission of data or information there between. The other one of the handset and the base station may be provided with a user interface for establishing a call to the telephony system, wherein control signals are exchanged between the handset and the base station to establish said call. The exchange of control information may be via said second type of wireless interfaces.

In all embodiments, the interface of the second type between the handset and the base station is a short range wireless interface. Where connection is provided to the telephony system via a wireless interface, such a wireless interface is preferably an intermediate or medium range wireless system.

In general, the telephony apparatus comprises a wireless handset and a base station or docking station. However in certain arrangements the telephony apparatus may only comprise a handset or a base station.

It should be noted that where reference is made herein to a Bluetooth interface or communication link, such reference is understood to be interchangeable with reference to a short-range communication link; a communication link supporting PCM transmissions; a communication link supporting A-law/u-law speech; a communication link supporting continuous variable slope delta (CVSD) encoded speech. As an alternative to a Bluetooth interface, the wireless interface between the wireless handset and the base station may be referred to as a wireless personal area network (WPAN).

It will be understood that whilst the invention has been described in the context of a telephony apparatus including a handset and a base station in a wireless PBX system, the invention may have broader applicability. The invention may be implemented, for example, in a fixed wired rather than a wireless PBX system.

The invention is not limited to use in a PBX environment. The invention may be implemented, for example, in a cordless telephony system such as is used in the home. A single telephony apparatus according to the described principles of the invention, including a handset and a base station, may in general be connected at an access point to any telephony system. This access point may, for example, be a plug-in access point to a public switched telephone network (PSTN), which may be provided in a home or public environment. This access point may, in an alternative example, be a wireless access point, such as found in either a cordless telephony system (e.g. within a home cordless telephony system with multiple wireless base stations a single one of which is connected to a PSTN, such a system being, for example, a digital enhanced cordless telephone (DECT) system), or a wireless cellular telephony system. Non-exhaustive examples of a wireless cellular telephony system include global system for mobile communications (GSM), universal mobile telecommunications system (UMTS), and code division multiple access (CDMA). Other mobile telephony systems/networks exist, and the telephony apparatus of the invention embodiments thereof may be used in any such systems/networks.

Other modifications and variations to the invention and embodiments described herein may be possible, and will be apparent to one skilled in the art. Features of various embodiments described herein may be combined in one or more alternate embodiments. The general scope of protection afforded by the invention is defined in the appended claims.

The invention claimed is:

1. A telephony apparatus comprising a base station and a handset, the handset being configured to communicate with a telephony system via an interface of a first type, the base station and the handset being provided with an interface of a second type to support communication there between, the handset comprising:
   a first baseband processor for processing signals communicated over the interface of the first type;
   a second baseband processor for processing signals communicated over the interface of the second type; and
   a voice over Internet protocol (VoIP) codec coupled to both the first baseband processor and the second baseband processor, the VoIP codec being configured to convert signals received over the interface of the first type via the first baseband processor to a format suitable for transmission over the interface of the second type via the second baseband processor, and to convert signals received over the interface of the second type via the second baseband processor to a format suitable for transmission over the interface of the first type via the first baseband processor.

2. A telephony apparatus according to claim 1 wherein the interface of the second type is a Bluetooth interface.

3. A telephony apparatus according to claim 1 wherein the interface of the first type is a wireless interface.

4. A telephony apparatus according to claim 1 wherein the interface of the first type is an IEEE 802.11 interface.

5. A telephony apparatus according to claim 1 wherein the interface of the second type is configured to transmit speech data between the handset and the base station.

6. A telephony apparatus according to claim 1 wherein the base station includes a speaker and microphone arranged as a speakerphone, the interface of the second type being configured to transmit speech data between the handset and the base station such that a telephone call established between the handset and the telephony system via said interface of a first type is relayed via said speakerphone.

7. A telephony apparatus according to claim 1 wherein the telephony system is a private branch exchange (PBX) system.

8. A telephony apparatus according to claim 1 wherein the interface of the second type is configured to transmit control data between the handset and the base station.

9. A telephony apparatus according to claim 8 wherein the control data is indicative of a status of a speakerphone operation.

10. A telephony apparatus according to claim 8 wherein the base station is provided with a user interface, the control data being associated with inputs and/or outputs of the user interface.

11. A telephony apparatus according to claim 10 wherein responsive to detection of an input at an input of the user interface, a control signal representing said input is transmitted from the base station to the handset on said interface of the second type.

12. A telephony apparatus according to claim 10 wherein the user interface includes a display indicative of the presence of a stored message, said display being controlled by a control message transmitted on the interface of the second type from the wireless handset.

13. A telephony apparatus according to claim 10 wherein responsive to generation of an output for a user interface, a control signal representing said output is transmitted from the handset to the base station on said interface of the second type.

14. A telephony apparatus according to claim 13 wherein the base station is adapted to generate an output on the user interface responsive to receipt of the control signal.

15. A handset of a telephony apparatus, the handset having a wireless interface of a first type for communicating with a telephony system, and a wireless interface of a second type for communicating with a base station, the handset further comprising:
 a first baseband processor for processing signals communicated over the interface of the first type;
 a second baseband processor for processing signals communicated over the interface of the second type; and
 a voice over Internet protocol (VoIP) codec coupled to both the first baseband processor and the second baseband processor, the VoIP codec being configured to convert signals received over the interface of the first type via the first baseband processor to a format suitable for transmission over the interface of the second type via the second baseband processor, and to convert signals received over the interface of the second type via the second baseband processor to a format suitable for transmission over the interface of the first type via the first baseband processor.

16. A handset according to claim 15 wherein the wireless interface of the second type is a Bluetooth interface.

17. A handset according to claim 15 wherein the wireless interface of the first type is an IEEE 802.11 wireless interface for communicating with a private branch exchange (PBX), and the wireless interface of the second type is of a shorter range than the IEEE 802.11 interface, the wireless interface of the second type being adapted to communicate speech data between the wireless handset and the base station.

18. A handset according to claim 15 wherein the handset is configured to transmit control data on the interface of the second type, the control data including data to control a user display on the handset, including a control signal for controlling a display on the base station indicative of the presence of voicemail messages.

19. A base station of a telephony apparatus, the base station having a wireless interface of the second type for communicating with the wireless interface of the second type in the handset of claim 15.

20. A base station according to claim 19 wherein the wireless interface of the second type is a Bluetooth interface.

21. A base station according to claim 19 wherein the wireless interface of the second type is configured to transport control data between the base station and the handset, the base station including a display for indicating the presence of voicemail messages, said display being controlled by a control signal received on the wireless interface of the second type.

* * * * *